Aug. 26, 1952  E. E. HEWITT  2,608,281
CONTROL APPARATUS
Filed June 28, 1946  2 SHEETS—SHEET 1
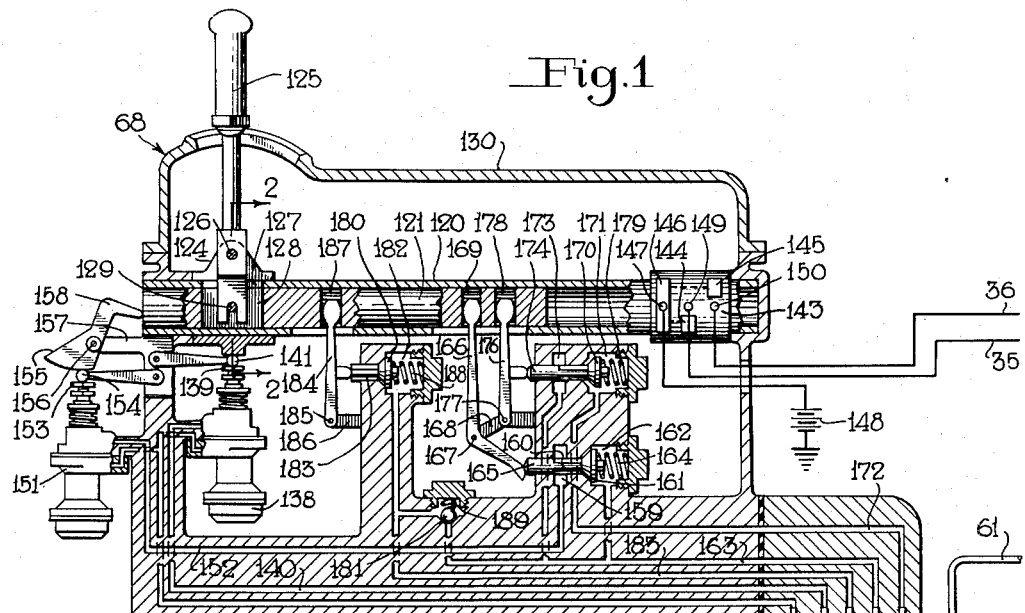
Fig. 1
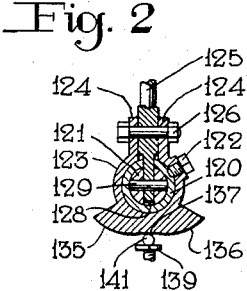
Fig. 2
Fig. 3
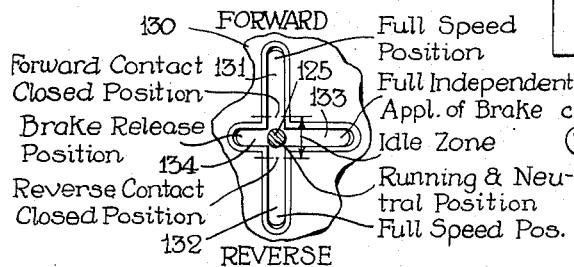
Fig. 4
INVENTOR.
Ellis E. Hewitt
BY
Frank E. Miller
ATTORNEY Aug. 26, 1952 — E. E. HEWITT — 2,608,281
CONTROL APPARATUS
Filed June 28, 1946 — 2 SHEETS—SHEET 2
Fig. 1-A
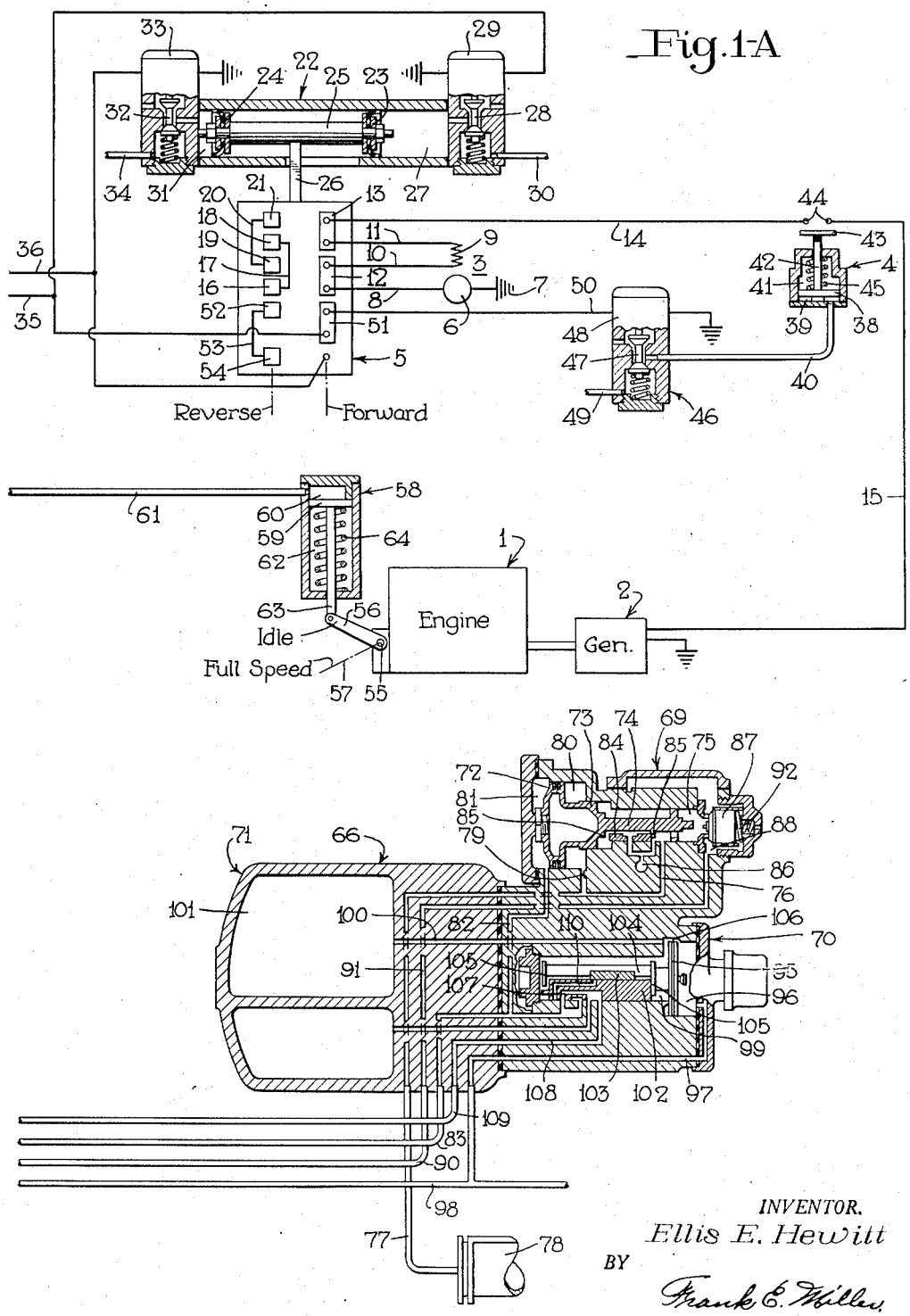
INVENTOR.
Ellis E. Hewitt
BY Frank E. Miller
ATTORNEY Patented Aug. 26, 1952

2,608,281

UNITED STATES PATENT OFFICE 2,608,281

CONTROL APPARATUS

Ellis E. Hewitt, Edgewood, Pa., assignor to Westinghouse Air Brake Company, a corporation of Pennsylvania Application June 28, 1946, Serial No. 679,995

11 Claims. (Cl. 192—3)

This invention relates to control apparatus for reversible locomotives of the type employing engine operated generators for providing electric current to operate propulsion or traction motors for driving the locomotive.

When a locomotive is employed in yard or switching service for switching cars, making up trains, etc., frequent starting, accelerating, slowing down, stopping and reversing of the locomotive is required, and normally one lever or handle is provided for controlling the speed or acceleration of the locomotive, another lever for controlling the reversing of the locomotive and still a third lever for controlling the brakes on the locomotive or for stopping the locomotive, the third lever usually constituting that of the independent brake valve device of the well known ET locomotive brake equipment.

The principal object of the invention is the provision of an improved apparatus of the above type embodying only one lever for controlling all of the operations of the three levers just mentioned, which have heretofore been considered necessary.

Other objects and advantages will become apparent from the following more detailed description of the invention.

In the accompanying drawings:

Figs. 1, 1-A, when the right hand edge of Fig. 1 is matched against the left hand edge of Fig. 1-A, is a diagrammatic view mainly in section of a locomotive control apparatus embodying the invention; Fig. 2 is a sectional view taken on the line 2—2 on an operator's control device shown in Fig. 1; Fig. 3 is a partial plan view of said operator's control device; and Fig. 4 is a diagrammatic view of a portion of an engineer's automatic brake valve device shown in Fig. 1 but with the rotary valve in a different position.

Description

As shown in the drawing, the reference numeral 1 designates an engine, which may be of the diesel internal combustion type, and which is arranged to operate an electric generator 2 for supplying electric current to operate a locomotive propulsion or traction motor 3; the supply of current to said motor being by way of a line switch 4 and a motor reverser 5.

The propulsion motor 3 comprises a motor armature 6 connected between a ground 7 and a lead 8 leading to the reverser 5, and a field coil 9 connected by leads 10 and 11 to said reverser. The reverser 5 may have forward and reverse positions as indicated by dot-dash lines and legends in the drawing. In the forward position of the reverser 5 a contact 12 thereon connects the motor lead 8 to the field lead 10, while a contact 13 connects the field lead 11 to a supply conductor 14. The line switch 4 is adapted to connect the conductor 14 to a conductor 15 leading to the generator 2, so that with the circuit just described closed and with the engine 1 operating, current will be supplied from said generator to the traction motor 3 to cause operation thereof to propel the locomotive in a forward direction.

In the reverse position of the reverser 5 the motor armature lead 8 will be connected by a contact 16 on the reverser, a wire 17 and another contact 18 to the field lead 11, while the other field lead 10 will be connected by a contact 19, a wire 20, and a contact 21 to the conductor 14, so that with the line switch 4 closed and with the engine 1 operating current will be supplied by generator 2 to the motor 3 to cause operation thereof to propel the locomotive in the reverse direction.

A fluid operated reversing motor 22 is provided for moving the reverser 5 to its forward and reverse positions. This motor comprises a casing containing two oppositely arranged pistons 23 and 24 connected for movement in unison by a rod 25. A member 26 connects the rod 25 to the reverser 5 whereby upon movement of the pistons 23 and 24 in the direction of the left hand to the position in which they are shown in the drawing the reverser 5 will assume its forward position, while upon movement in the opposite direction to a position defined by contact between piston 23 and the right hand end of the casing the reverser will assume its reverse position.

At the outer face of piston 23 is a pressure chamber 27, and a valve 28 controlled by a forward magnet 29 is operative upon energization of said magnet to supply fluid under pressure to said chamber from a supply pipe 30, and upon deenergization to cut off such supply and to open chamber 27 to atmosphere. At the opposite side of piston 24 is a pressure chamber 31, and a valve 32 controlled by a reverse magnet 33 is operative upon energization of said magnet to supply fluid under pressure to said chamber from a fluid pressure supply pipe 34 while upon deenergization of said magnet said valve is adapted to open chamber 31 to atmosphere. Current for energizing the forward magnet 29 is adapted to be provided through a forward control wire 35, while current for energizing the reverse magnet 33 is adapted to be provided over a reverse control wire 36.

With the forward magnet 29 energized and operating valve 28 to supply fluid under pressure to pressure chamber 27 at a time when the reverse magnet 33 is deenergized opening chamber 31 to atmosphere the piston 23 will be operated to move the motor reverser 5 to its forward position in which it is shown in the drawing. On the other hand when the reverse magnet 33 is energized and operating valve 32 to supply fluid under pressure to pressure chamber 31, and the forward magnet 29 is deenergized for opening chamber 27 to atmosphere, piston 24 will be operated to move the motor reverser 5 to its reverse position.

The line switch 4 may comprise a casing containing a piston 38 having at one side a pressure chamber 39 connected to a pipe 40, and having at the opposite side a non-pressure chamber 41. Projecting from piston 38 through the non-pressure chamber 41 is a piston rod 42 connected at one end to said piston. Secured to the opposite end of the piston rod 42 outside of the casing is a movable electric contact 43 arranged to electrically connect two fixed contacts 44 connected, respectively, to the conductors 14 and 15 for thereby connecting the generator 2 to the reverser 5 for connection with the traction motor 3. A spring 45 contained in non-pressure chamber 41 acts on piston 38 for moving said piston to the position in which it is shown in the drawing, upon release of fluid under pressure from pressure chamber 39, for pulling the movable contact 43 out of engagement with the fixed contacts 44. When fluid is supplied through pipe 40 to pressure chamber 39 at a pressure sufficient to overcome the opposing pressure of spring 45 on piston 38 said piston will move against said spring for moving the movable contact 43 into circuit closing relation with the fixed contacts 44.

The supply and release of fluid under pressure to and from pipe 40 is controlled by an electromagnet valve device 46 which comprises a valve 47 and a magnet 48 for controlling said valve. Upon energization of magnet 48 the valve 47 will be operated to supply fluid under pressure from a fluid pressure supply pipe 49 to pipe 40 and thence to pressure chamber 39 in the line switch 4 for actuating said switch to connect the generator 2 to the motor reverser 5, while upon deenergization of magnet 48 the valve 47 will connect pipe 40 to atmosphere for releasing fluid under pressure from chamber 39 in the line switch to permit operation of said switch to its circuit opening position.

Energization of magnet 48 is controlled through a wire 50 leading to the motor reverser 5. The motor reverser 5 is provided with a contact 51 for connecting wire 50 to the forward control wire 35 when said reverser is in its forward position, so that when said current is supplied to said wire 35, in a manner which will be later described, and when said reverser is in its forward position, current from wire 35 will be supplied through wire 50 to magnet 48 for effecting energization thereof. In the reverse position of the motor reverser 5 the magnet wire 50 is adapted to be connected by a contact 52, a wire 53 and a contact 54 to the reverse control wire 36, so that when current is supplied to wire 36, in a manner which will be later described, and when the reverser 5 is in its reverse position, current will flow to magnet 48 for energizing same. It will therefore be seen that the magnet 48 will be energized to effect operation of the line switch 4 to its circuit closing position only in the forward and reverse positions of the motor reverser 5, and that the magnet 48 will be deenergized to effect operation of the line switch 4 to its circuit opening position during movement between said positions.

The engine 1 has a rockable fuel control shaft 55 for varying the amount of fuel supplied to said engine to thereby vary the speed or power output thereof in any conventional manner. A lever 56 is connected to shaft 55 for turning it to different positions, said lever and shaft having an idle position in which they are shown in the drawings for causing operation of said engine at an idling speed and being movable out of said position in the direction of a dot-dash line 57 for increasing the speed or power output of the engine in proportion to the extent of such movement, said line designating a position for said lever for supplying a maximum amount of fuel to the engine. Thus any desired speed of engine 1 may be obtained in turn causing a corresponding electric output from the generator 2.

For adjusting the fuel control lever 56 speed regulating means in the form of a fluid motor 58 is provided which comprises a casing containing a movable abutment preferably in the form of a piston 59 having at one side a pressure chamber 60 connected to a speed control pipe 61 and having at the opposite side a non-pressure chamber 62. Projecting from piston 59 through the non-pressure chamber 62 is a piston rod 63 connected to the fuel control lever 56. A spring 64 in non-pressure chamber 62 acts on piston 59 in opposition to pressure of fluid in pressure chamber 60. When the chamber 60 is open to atmosphere, in a manner which will be later described, spring 64 is adapted to move piston 59 to the position in which it is shown in the drawing for moving the fuel control lever 56 to its idle position. When fluid is supplied through the control pipe 61 to pressure chamber 60 at a pressure sufficient to overcome the opposing force of spring 64 on piston 59, said piston is adapted to move against said spring for rocking fuel control lever 56 out of idle position to an extent depending upon the pressure of such fluid. It will thus be apparent that by providing a suitable pressure of fluid in chamber 60 the fuel control lever 56 may be caused to assume any desired position out of its idle position.

The control apparatus further comprises a distributing valve device 66, an engineer's automatic brake valve device 67 and an engineer's controller 68. The controller 68 is provided for controlling operation of the motor reverser 5 through the medium of the reversing motor 22, operation of engine 1 through the medium of the speed regulating motor 58, and also embodies features of the usual independent brake valve device of the well known ET locomotive brake equipment for controlling operation of the distributing valve device 66.

The distributing valve device 66 comprises an application portion 69 and an equalizing portion 70 both of which portions are mounted on a reservoir portion 71.

The application portion 69 comprises an application piston 72 connected through the medium of a baffle piston 73 to a stem 74 which projects into a valve chamber 75. The valve chamber 75 is connected by a passage 76 and a pipe 77 to a brake cylinder device 78 which is adapted to be operated by fluid under pressure to apply the locomotive brakes. The locomotive brakes are adapted to be released upon release of fluid under pressure from the brake cylinder device 78. Passage 76 is also connected through a restricted passage 79 to a chamber 80 formed between the pistons 72 and 73. At the opposite side of the application piston 72 is a control chamber 81 connected by a passage 82 to the usual application cylinder pipe 83 leading to the automatic brake valve device 67 and to the controller 68. A slide valve 84 contained in valve chamber 75 and mounted between spaced shoulders 85 on the piston stem 74 is provided for operation by the piston stem 74 to control communication between valve chamber 75 and an atmospheric vent port 86. The application portion 69 further comprises an application valve 87 for controlling communication between a chamber 88 and valve chamber 75. The chamber 88 is adapted to be constantly supplied with fluid under pressure from a main reservoir 89 by way of a pipe 90 and a passage 91 through the distributing valve device. A spring 92 acts on the application valve 87 for urging it into contact with a seat in the casing for closing communication between chambers 88 and 75, said valve being arranged in coaxial relation with the piston stem 74 for engagement thereby upon movement of the application piston 72 in the direction of the right hand.

In operation, when fluid under pressure is supplied to the application piston chamber 81, as will be later described, such pressure will move the application piston 72 in the direction of the right hand for initially shifting the slide valve 84 to a position for closing communication between valve chamber 75 and the atmospheric vent port 86 and for then opening the application valve 87. With the application valve 87 open fluid under pressure will flow from the main reservoir 89 to valve chamber 75 and thence through passage 76 and pipe 77 to the brake cylinder device 78 for causing operation of said brake cylinder device to apply the locomotive brakes. As fluid under pressure is supplied to passage 76 it will also flow through the restricted passage 79 into chamber 80, and the pressure thus obtained in said chamber plus that acting on the opposite side of the baffle piston 73 in valve chamber 75 opposes the control pressure provided in chamber 81 on the opposite side of the application piston 72 and when this opposing pressure becomes increased to a sufficient degree, it will move piston 72 in the direction of the left hand to permit closing of the application valve 87 by spring 92. Further flow of fluid under pressure to valve chamber 75 will then be prevented and movement of the application piston 72 will cease in what is known as a lap position in which the slide valve 84 is still closing communication between valve chamber 75 and the atmospheric vent port 86. The pressure of fluid thus obtained in the brake cylinder device 78 will therefore be limited in accordance with the pressure of fluid provided in the application piston chamber 81. If the pressure of fluid in the application piston chamber 81 is further increased the application portion 72 of the distributing valve device will again operate in the manner just described to effect a corresponding increase in the pressure of fluid in the brake cylinder device 78. On the other hand, if the pressure of fluid in the application piston chamber 81 is reduced the opposing pressure of fluid in chambers 80 and 75 will actuate piston 72 to shift the slide valve 84 to the position shown in the drawing for opening communication between valve chamber 75 and the atmospheric vent port 86. Fluid under pressure will then be released from the brake cylinder device 78 and the valve chamber 75 to atmosphere for releasing the brakes on the locomotive. If the reduction in pressure of fluid in the application piston chamber 81 is less than to that of the atmosphere, then when the pressure in valve chamber 75 and in piston chamber 80 becomes reduced to a degree slightly lower than that still acting in the application piston chamber 81, the application piston 72 will be moved in the direction of the right hand for shifting the slide valve 84 from the position in which it is shown in the drawing to a position for closing communication between valve chamber 75 and the atmospheric vent port 76, whereupon further release of fluid under pressure from valve chamber 75 and the brake cylinder device will be prevented and fluid will be held in the brake cylinder device at a pressure equal substantially to that in the application piston chamber 81. However, if the pressure in the application piston chamber 81 is reduced to that of the atmosphere the application piston 72 will remain in the position in which it is shown in the drawing, whereupon a complete release of fluid under pressure from the brake cylinder device 78 will occur resulting in a complete release of locomotive brakes. It will thus be seen that the application portion 69 of the distributing valve device is effective to cause application of the locomotive brakes to any desired degree, corresponding to the pressure of fluid provided in the application piston chamber 81, and the degree of application may be either increased or decreased in such steps as desired by providing the proper increase or decrease in pressure in the application piston chamber 81.

The equalizing portion 70 of the distributing valve device comprises a piston 95 having at one side a chamber 96 open through a passage 97 to the usual brake pipe 98 which is connected to the engineer's automatic brake valve device 67. At the opposite side of the equalizing piston 95 is a valve chamber 99 connected through a passage 100 to the usual pressure chamber 101 and containing a main slide valve 102 and an auxiliary slide valve 103 mounted on said main slide valve. The piston 95 has a stem 104 projecting into valve chamber 99, and the main slide valve 102 is mounted between two spaced collars 105 on said stem, while the auxiliary slide valve 103 is mounted in a recess in said stem for movement therewith.

The operation of the equalizing portion of the distributing valve is well known, but briefly, the parts thereof have a release position in which they are shown in the drawing and which they assume upon charging the brake pipe 98 to its normal degree of pressure. The parts of the equalizing portion of the distributing valve device also have a service position, which they assume upon a service reduction of pressure in the brake pipe 98, a service lap position assumed upon effecting a service application of brakes to a degree corresponding to a chosen service reduction in pressure in brake pipe 98, and an emergency position which is assumed upon an emergency reduction in pressure in said brake pipe.

In the release position of the parts of the equalizing portion of the distributing valve device a feed groove 106 is open around the piston 95 to permit flow of fluid under pressure from brake pipe 98 through chamber 96 to valve chamber 99 and thence through passage 100 to pressure chamber 101 for charging said chambers. In this position of the main slide valve 102 a cavity 107 therein establishes communication between passage 82, connected to the application piston chamber 81, and a passage 108 connected to the usual distributing valve release pipe 109, which pipe is normally open to atmosphere, as will be later described, for releasing fluid under pressure from the application piston chamber 81 to effect operation of the application portion 69 of the distributing valve device to release fluid under pressure from the brake cylinder device 78 for effecting a release of the locomotive brakes.

In service position of the equalizing portion 70 of the distributing valve device a service port 110 will be uncovered by the auxiliary slide valve 103 and will be also connected to passage 82 to permit flow of fluid under pressure from pressure chamber 101 through valve chamber 99 to passage 82 and thence to the application piston chamber 81 for effecting operation of the application portion 69 of the distributing valve device to supply fluid under pressure to the brake cylinder device 78 for applying the locomotive brakes. When the pressure of fluid in pressure chamber 101 and in valve chamber 99 is thus reduced to a degree slightly lower than the opposing reduced brake pipe pressure in chamber 96 the equalizing piston 95 will move the auxiliary slide valve 103 relative to the main slide valve 102 to the service lap position for closing communication between the service port 110 and valve chamber 99. The supply of fluid under pressure to the application piston chamber 81 will therefore be limited to a degree corresponding to the service reduction in pressure in the brake pipe 98, for in turn limiting the pressure of fluid obtained in the barke cylinder device 78 to a corresponding degree, whereby the degree of application of locomotive brakes will be limited in accordance with the service reduction of pressure in brake pipe 98.

In emergency position passage 82 will be open past the left hand end of the main slide valve 102 to valve chamber 99 to permit equalization of pressure of fluid in pressure chamber 101 into the application piston chamber 81 to thereby effect operation of the application portion 69 of the distributing valve device to provide a maximum pressure of fluid in the brake cylinder device 78 and thereby a maximum or emergency degree of brake application on the locomotive.

The engineer's automatic brake valve device 67 comprises a casing containing a rotary valve 113 which is operable by a lever or handle 115 to the usual running position for charging the brake pipe 98 with fluid under pressure, to the usual service position for reducing the pressure of fluid in the brake pipe at a service rate, service lap position for limiting the degree of service reduction in pressure in the brake pipe 98, and emergency position for effecting an emergency reduction in pressure in said brake pipe and for supplying at a restricted rate fluid under pressure to the application cylinder pipe 83 to maintain the pressure of fluid in the application piston chamber 81. These operations of the engineer's automatic brake valve device are well known and are not pertinent to a clear understanding of the invention in view of which a further description thereof will be dispensed with.

Also connected to the engineer's automatic brake valve device 67 is a pipe 111 which is adapted to be connected to the distributing valve release pipe 109 through the controller 68 in a manner which will be later described. The pipe 111 is adapted to be connected through a cavity 112 in the rotary valve 113 of the engineer's automatic brake valve device 67, when in its running position, to an atmospheric vent port 114, while in all other positions of said rotary valve communication between pipe 111 and vent port 114 is adapted to be closed.

It is to be understood that the engineer's automatic brake valve device 67 is provided for controlling through the medium of the brake pipe 98 not only operation of the distributing valve device 66 on the locomotive, for controlling the locomotive brakes, but also operation of triple valves or the like on cars of a train for controlling the automatic application and release of brakes on said cars to which the locomotive may be connected. The independent brake valve device of the well known ET locomotive brake equipment is usually provided for controlling the brakes on the locomotive independently of those on the cars of a train, as well known, but according to the invention the usual independent brake valve device is dispensed with and the functions thereof are embodied in the controller 68, which will now be described.

The controller 68 comprises a casing in which is journaled a rockable control shaft 120 which is hollow for at least a portion of its length, and slidably mounted in this hollow portion of said shaft and extending through one end thereof is a plunger 121 arranged to be moved longitudinally in and relative to said shaft. Encircling and secured by a set screw 122 to one end of rock shaft 120 is a cam element 123 having at one side of the shaft two upstanding parallel arranged arms 124 between which is disposed a portion of an operator's control lever 125. A bolt 126 extending through the arms 124 and lever 125 secure the lever to the cam element 123 whereby said lever is operable to rock the shaft 120 upon movement in a direction circumferentially of said shaft. The lever 125 is also rockable on the pin 126 in a direction longitudinally of and relative to the shaft 120. Below the bolt 126 the lever 125 extends through a slot 127 in the rock shaft 120 and into a recess 128 in plunger 121, said plunger carrying a pin 129 extending through a slot in the end of said lever whereby said plunger is movable longitudinally in and relative to the rock shaft 120 upon movement of the operator's control lever 125 lengthwise of said shaft.

Secured to the casing of the controller 68 is a cover 130 having a cross slot through which the lever 125 extends, said lever having a running and neutral position at the cross of said slot. The slot comprises two oppositely arranged portions 131 and 132 arranged to permit movement of lever 125 in either one direction or in the opposite from the running and neutral position for rocking the rock shaft 120, and oppositely arranged portions 133 and 134 arranged at right angles to the portions 131 and 132 for permitting movement of said lever from neutral position in the direction of the length of said rock shaft. A short distance from neutral position into portion 131 of the slot the lever 125 has a forward contact closed position (Fig. 3) and between this position and the outer end of the portion 131 said lever has a speed control zone, a full speed position being at the outermost portion of the portion 131 of the slot. At the opposite side of neutral position in the portion 132 of the slot the lever 125 has an oppositely arranged reverse contact closed position, and a speed control zone therebetween and a full speed position at the extreme outermost portion of the portion 132 of the slot. Between the forward contact closed position and the reverse contact closed position there is an engine idling zone. The portion 133 of the slot constitutes a brake application control zone, the extreme end portion thereof providing for movement of lever 125 to effect a full independent application of brakes. The slot portion 134 at the opposite side of neutral position of lever 125 provides for movement of said lever to a brake release position. These different positions of the operator's control lever 125 are designated in Fig. 3 of the drawing by lines and suitable legends.

Below the rock shaft 120 the cam element 122 has two identical but oppositely arranged cam surfaces 135 and 136 which are connected together by a surface 137 formed concentric with the rock shaft 120 and having an accurate length equal to that of the movement of lever 125 between the forward and reverse contact closed positions.

The reference numeral 138 indicates an engine speed or power control means in the form of a self-lapping fluid pressure supply and release valve device which may be identical to that fully disclosed in Patent No. 2,381,222 issued on August 7, 1945, to Harry C. May, and which, briefly, comprises a plunger 139 and valve means (not shown) controlled by said plunger for varying the pressure of fluid in a passage 140 in proportion to the extent of movement of said plunger into said device from a normal position, in which it is shown in Figs. 1 and 2 of the drawing. In the normal position of plunger 139 the self-lapping valve device 138 is adapted to open passage 140 to atmosphere. The plunger 139 is connected through a rockable follower 141 to the surface 137 of the cam element 122 when the control lever 125 is between the forward and reverse contact closed positions, said surface being so arranged as to permit movement of said plunger to its normal position for opening the passage 140 to atmosphere. Upon movement of lever 125 past either the forward or the reverse contact closed position in the direction of the respective full speed position, the cam surface 135 or 136 is adapted to move the plunger 139 into the self-lapping valve device 138 for effecting operation of said device to supply fluid to passage 140 at a pressure proportional to the extent of such movement of said lever.

Passage 140 is connected to pipe 61 leading to the fluid motor 58 which is arranged to control the speed or power output of engine 1, and it will therefore be seen that with the lever 125 between the forward and reverse contact closed positions the engine 1 will operate at idling speed, while upon movement of said lever beyond either of these positions is the direction of the respective full speed position, the engine 1 will be caused to operate at a proportionally greater speed for causing operation of the generator 2 to provide a corresponding output.

Also secured to turn with the rock shaft 120 is a contactor in the form of a drum 143 having a forward contact 144, a reverse contact 145, and a contact 146 adapted to be constantly connected through a fixed contact 147 to a source of electrical energy, such as a storage battery 148. Two fixed contacts 149 and 150 connected to the forward and reverse control wires 35 and 36, respectively, are provided for engagement by the forward and reverse contacts 144 and 145. With the operator's control lever between the forward and reverse contact closed positions the fixed contacts 149 and 150 are adapted to be disengaged from the drum contacts 144 and 145, respectively. In the forward contact closed position of lever 125 the fixed contact 149 is adapted to engage the forward contact 144 and this engagement is adapted to be maintained between said position and the full speed position at the end of portion 131 of the cross slot. In the reverse contact closed position of lever 125 fixed contact 150 is adapted to be engaged by the drum contact 145 and this engagement is adapted to be maintained between said position and the full speed position at the end of portion 132 of the slot.

It will now be seen that when the operator's control lever 125 is in its neutral position, in which it is shown in the drawing, the engine 1 will operate at idling speed and the power output of generator 2 will be correspondingly reduced, and both the forward and reverse control wires 35 and 36 will be deenergized, due to which, magnet 48 will be deenergized opening chamber 39 in the line switch 4 to atmosphere, as a result of which, the movable contact 43 will be out of engagement with the fixed contacts 44 thereby interrupting the circuit between generator 2 and the traction motor 3. Also magnets 29 and 33 will be deenergized, and the respective pressure chambers 27 and 31 will be open to atmosphere whereupon the motor reverser 5 will remain in the position it last occupied.

Now assume that the operator's control lever 125 is moved into the portion 131 of the cross slot. When said lever obtains the forward contact closed position the fixed contact 149 will be engaged by the drum contact 144 for supplying electric current to the forward magnet 29 whereupon energization of said magnet will operate the valve 28 to supply fluid under pressure to chamber 27 in the reversing motor 22. With the parts of the reversing motor 22 and thereby of the motor reverser 5 already in their forward position, in which they are shown in the drawing, contact 51 of the motor reverser will connect wire 35 to wire 50 so that magnet 48 will be energized for actuating valve 47 to supply fluid under pressure to the line switch 4 for actuating said switch to connect the generator 2 to the motor reverser 5 and through said reverser to the traction motor 3, whereupon current generated by generator 2 will become effective in the traction motor 3 to cause the locomotive to move in a forward direction. By suitable adjustment of the operator's control lever 125 between the forward contact closed position and the full speed position in the portion 131 of the slot the engine 1 may then be caused to operate at any desired speed for causing a corresponding output of generator 2 and thereby operation of motor 3 to propel the locomotive forward at any desired speed.

If the operator now moves the control lever 125 out of the portion 131 of the slot into the portion 132, movement through the forward contact closed position will interrupt the circuit between battery 148 and the forward control wire 35 whereupon magnet 48 will become deenergized to effect operation of the line switch 4 to open the circuit between generator 2 and the traction motor 3, and magnet device 29 will become deenergized to permit operation of valve 28 to open pressure chamber 27 in the reverser motor 22 to atmosphere. Movement of the lever into the reverse contact closed position will then bring the drum contact 145 into engagement with fixed contact 150 whereupon current from battery 148 will be supplied to the reverse control wire 36 and thence to magnet 33 and to the motor reverser 5. With the motor reverser 5 still in forward position the supply of current to magnet 48 will be maintained off until said reverser is moved to its reverse position, as a result of which, the line switch 4 will remain in its open position. Energization of magnet 33 will however, effect operation of valve 32 to supply fluid under pressure to pressure chamber 31 for thereby actuating piston 24 to move the reverser 5 to its reverse position, and when said position is obtained the reverse control wire 36 will be connected through contact 54, wire 53 and contact 52 to wire 50, and magnet 48 will be energized to supply fluid under pressure to the line switch 4 for effecting operation thereof to close the circuit between generator 2 and the motor reverser 5, which in the reverse position will connect the generator 2 to the traction motor 3. Movement of the operator's control lever beyond the reverse contact closed position into the portion 132 of the cross slot will then cause acceleration of engine 1 and generator 2 for causing operation of the traction motor 3 to propel the locomotive at a speed proportional to the extent of such movement.

If the lever 125 is moved from the portion 132 of the slot into the portion 131, the line switch 4 will be operated to open the circuit of the traction motor 3 when the lever passes through the reverse contact closed position, and the speed control motor 58 will be operated to permit movement of the fuel control lever 56 to idle position to permit reduction in the speed of engine 1 and in the output of generator 2. As the lever is then moved through the forward contact closed position the reverser motor 22 will operate to reverse the motor reverser 5 and at the termination of such reversal the line switch 4 will act to close the circuit between the generator 2 and traction motor 3. Movement of the control lever beyond the forward contact closed position into the portion 131 of the slot will then cause operation of the engine 1 and generator 2 to supply current to motor 3 for causing movement of the locomotive in the forward direction at a speed corresponding to the position of the operator's control lever 125.

If the operator's control lever 125 is moved from either the portion 131 or from the portion 132 of the slot to its neutral position, the speed of the engine 1 will be reduced to idling and the line switch 4 will operate to open the circuit between the generator 2 and the traction motor 3.

The operator's controller 68 besides controlling reversing of the locomotive and the power for operating it in either a forward or reverse direction as above described, is also operative from its neutral position, that is, when the propulsion power is cut off, to cause operation of the distributing valve device 66 to brake the locomotive to slow it down or bring it to a stop, as will now be described.

The controller 68 further comprises a self-lapping brake control valve device 151 arranged to supply fluid under pressure to and to release fluid under pressure from a passage 152. The self-lapping valve device 151 may be identical to the self-lapping valve device 138 and comprises a plunger 153 engaged by one side of a follower 154 the opposite side of which is engaged by a cam 155 which is fulcrumed on a pin 156 carried in an arm 157 projecting from the casing. The cam 155 is provided with an arm 158 which engages one end of plunger 121 and is so designed that with the operator's control lever in its running and neutral position the self-lapping brake control valve device 151 will open passage 152 to atmosphere. Upon movement of lever 125 out of neutral position into the slot portion 133 the valve device 151 will be operated to provide in passage 152 fluid at a pressure proportional to the extent of movement away from neutral position.

Passage 152 leads to a chamber 159 containing a fluted stem 160 projecting from a check valve 161 which is contained in a chamber 162. Chamber 162 is open to a passage 163 which is connected to the distributing valve release pipe 109 and contains a spring 164 acting on valve 161 for urging it to a closed position. Projecting to the exterior of the casing from the fluted stem 160 is a cylindrical stem 165 the end of which is engaged by one end of a lever 166. The lever 166 is fulcrumed intermediate its ends on a pin 167 carried in an arm 168 projecting from the casing, while the opposite end of said lever is disposed in a recess 169 in the plunger 121 for movement therewith. Initial movement of the operator's control lever 125 from its neutral position into the portion 133 of the slot is adapted to actuate lever 166 to unseat the valve 161 for thereby opening communication between passages 152 and 163.

In yard service the braking or stopping of a locomotive and any cars which may be attached thereto is usually effected by braking of the locomotive only. The engineer's automatic brake valve device 67 will therefore normally be in its running position, the brake pipe 98 will be fully charged and the equalizing portion 70 of the distributing valve device 66 will be in its release position establishing communication between passage 82 from the application piston chamber 81 and passage 108 open to the distributing valve release pipe 109. To apply the brakes on the locomotive for stopping or decelerating the locomotive and any cars which may be coupled thereto the operator will therefore usually move lever 125 out of neutral position into the portion 133 of the slot, this movement actuating lever 166 to open the check valve 161, and also effecting operation of the self-lapping brake control valve device 151 to supply fluid under pressure to passage 152. Fluid supplied to passage 152 will then flow past the check valve 161 to passage 163 and thence through the distributing valve release pipe 109 to the equalizing portion 70 of the distributing valve device and thence through cavity 107 in the main slide valve 102 to passage 82 leading to the application piston chamber 81. The application portion 69 of the distributing valve device will thereby be operated to supply fluid under pressure to the brake cylinder device 78 for applying the locomotive brakes to a degree corresponding to the pressure of fluid provided in the application piston chamber 81 which in turn will vary according to the distance the operator's control lever 125 is away from neutral position in the slot portion 133. If less than a full application of brakes is effected, the degree of application may be increased by moving lever 125 further away from neutral position into the slot portion 133, while if it is desired to reduce the degree of brake application, said lever may be moved toward the neutral position, the self-lapping valve device 151 operating to either increase or decrease the pressure in passage 152 and thereby the degree of brake application in accordance with the position of said lever in the slot portion 133. A maximum degree of brake application will be obtained in the full independent application position of lever 125, while a complete release will be obtained in the neutral position of said lever.

The operator's controller 68 further comprises a check valve 170 contained in a chamber 171 which is open through a passage 172 to pipe 111 leading to the operator's automatic brake valve device 67. The valve 170 has a fluted stem extending into a chamber 173 which is open to passage 163, and extending from said fluted stem is a cylindrical stem 174 projecting to the exterior of the casing for engagement by a lever 176 intermediate its ends. One end of lever 176 is fulcrumed on a pin 177 carried in the arm 169, while the other end extends into a recess 178 in plunger 121 for movement therewith. When the control lever 125 is in neutral position or in either of the slot portions 131 or 132 the lever 176 is adapted to be operated to hold valve 170 open for establishing communication between the distributing valve release pipe 109 and pipe 111 leading to the operator's automatic brake valve device 67. When the operator's control lever 125 is moved out of the neutral position into the slot portion 133 for applying the brakes on the locomotive the lever 176 is operated to permit closing of valve 170 by a spring 179. The valve 170 is also opened upon movement of the operator's control lever 125 to its brake release position in the portion 134 of the slot, but this is immaterial.

The valve 170 is closed when the operator's control lever 125 is moved into the slot portion 133 for closing communication between the distributing valve release pipe 109 and pipe 111, which latter pipe is open to atmosphere through the engineer's automatic brake valve device 67 when in its running position, in order that fluid pressure supplied by the self-lapping brake control valve device 151 to passage 163 and thence to the distributing valve release pipe 109 for actuating the application portion 69 of the distributing valve device to apply the locomotive brakes, cannot be vented to atmosphere through pipe 111 and the vent port 114 in the automatic brake valve device 67. When the brakes on the locomotive are controlled by operation of the automatic brake valve device 67 in the usual manner, the operator's control lever 125 will be in its neutral position or possibly under certain conditions in either of the slot portions 131 or 132, under which condition the valve 170 will be opened. Thus if the brakes of the locomotive have been applied by the engineer's automatic brake valve device 67 and said device has been returned to its running position a release of fluid under pressure from the application piston chamber 81 for releasing the locomotive brakes can occur by way of the distributing valve release pipe 109, past the open valve 170 and thence through pipe 111 and the vent port 114 in said brake valve device.

When the brakes on the locomotive and cars of a train have been applied by operation of the automatic brake valve device 67 the operator may desire to release and subsequently reapply the brakes on the locomotive independently of the brakes on the train. To accomplish this a valve 180 and a check valve 181 are provided.

The valve 180 is contained in a chamber 182 which is connected by a passage 183 to the application cylinder pipe 83 which is in constant communication through passage 82 with the application piston chamber 81 in the distributing valve device 70. The valve 180 has a fluted stem 183 extending to the exterior of the casing where the end of said stem is engaged by a lever 184. One end of lever 184 is fulcrumed on a pin 185 carried in an arm 186 projecting from the casing, while the opposite end of said lever is disposed in a recess 187 in plunger 121 for movement therewith. A spring 188 in chamber 182 acts on valve 180 for urging it to its closed position.

The valve 180 is adapted to be seated at all times under the pressure of spring 188 except when the lever is moved into the slot portion 134 whereupon the lever 184 will be operated to open valve 180 for releasing fluid under pressure from the application piston chamber 81 to atmosphere to effect operation of the application portion 69 of the distributing valve device for effecting a release of the locomotive brakes. It will thus be apparent that the brakes on the locomotive can be released by movement of the operator's control lever 125 into the slot portion 134 at any time, that is, even an application of brakes effected by operation of the automatic brake valve device 67 and distributing valve device 66.

Assuming that the equalizing portion 70 of the distributing valve device has been operated to effect an application of locomotive brakes and that the parts of said device have been returned to their service lap position thereby closing communication between passage 82 and the distributing valve release pipe 109, and an application of brakes had been released by opening of valve 180 in the controller 68, as just described, the locomotive brakes may be reapplied, if desired, by moving the operator's control lever 125 into the portion 133 of the slot for thereby opening valve 161 and for actuating the self-lapping brake control valve device 151 to supply fluid under pressure to passage 152. The fluid pressure thus supplied to passage 152 will flow past valve 161 to passage 163 and thence past the check valve 181 to passage 183 and thence directly to the application piston chamber 81 by way of the application pipe 83 and passage 82 for operating the application portion of the distributing valve device to apply the locomotive brakes.

A spring 189 acts on the check valve 181 for normally urging it to a closed position. The check valve 181 normally closes communication between passages 183 and 163 so that when the equalizing portion 70 of the distributing valve device 66 is in either service position or emergency position supplying fluid under pressure to effect an application of brakes, the pressure of fluid thus effective in passage 183 will be prevented from flowing to passage 163, so that in case the lever 125 is unintentionally moved into the slot portion 133 and opens valve 161, fluid in the application cylinder pipe 83 and thereby in passage 183 cannot flow to the self-lapping brake control valve device 151 which would operate to reduce such pressure to a degree corresponding to the position of said lever in the slot portion 133 and thereby effect a corresponding reduction in pressure of fluid in the application piston chamber 81 with a corresponding reduction in the degree of brake application on the locomotive.

*Summary*

From the above description it will now be seen that the reversing, speed and braking of the locomotive is controlled by the single lever 125, and that the several different functions of said lever are so correlated as to prevent the locomotive brakes being applied by operation of said lever except when the power is cut-off to the traction motor 3 and the speed control lever 56 is adjusted to its engine idling position, and said motor cannot be connected to the generator and the engine 1 cannot be accelerated to cause movement of the locomotive except with the brakes released.

The brake control apparatus controlled by lever 125 provides for applying and releasing the locomotive brakes at the will of the operator. If desired the operator by operating lever 125 may even release a so-called automatic application of brakes effected by operation of the automatic brake valve device 67 and then subsequently reapply the locomotive brakes if conditions require such. Moreover in the zone of movement including neutral position and the slot portions 132 and 131, the controller 68 provides for the usual automatic control of locomotive brakes by operation of the automatic brake valve device 67.

Having now described the invention what I claim as new and desire to secure by Letters Patent is:

1. A control apparatus for a locomotive comprising power regulating means for said locomotive, braking means operable by fluid under pressure to effect braking of said locomotive, brake control means for controlling supply and release of fluid under pressure to and from said braking means, an operator's control lever having a neutral position and movable thereupon in either one direction or in another direction, means for preventing movement of said lever in either one of said directions except from said neutral position, means operable upon movement of said lever from said neutral position in said one direction to effect operation of said power regulating means to accelerate said locomotive, means operable upon movement of said lever to said neutral position to effect operation of said power regulating means to cut off the power to propel said locomotive, means operable upon movement of said lever from neutral position in said other direction to supply fluid under pressure to said braking means, and means operable upon movement of said lever to said neutral position to release fluid under pressure from said braking means.

2. A brake and speed control apparatus comprising fluid pressure regulated braking means, fluid pressure regulated speed control means, a self-lapping fluid pressure brake control device for regulating the pressure in said braking means, another self-lapping fluid pressure speed control device for regulating pressure of fluid in said speed control means, a rock shaft, means operable by rocking of said shaft to control said speed control device, a plunger, means operable by longitudinal movement of said plunger to control said brake control device, and an operator's control lever operatively connected to said shaft and plunger for selectively actuating same.

3. A brake and speed control apparatus comprising fluid pressure regulated braking means, fluid pressure regulated speed control means, a self-lapping fluid pressure brake control device for regulating the pressure in said braking means, another self-lapping fluid pressure speed control device for regulating pressure of fluid in said speed control means, a rock shaft, means operable by rocking of said shaft from a normal position to control said speed control device, a plunger, means operable by longitudinal movement of said plunger from a normal position to control said brake control device, an operator's control lever, and means connecting said lever to said shaft and plunger providing for selective operation of said shaft and plunger.

4. A brake and speed control apparatus comprising fluid pressure regulated braking means, fluid pressure regulated speed control means, a self-lapping fluid pressure brake control device for regulating the pressure in said braking means, another self-lapping fluid pressure speed control device for regulating pressure of fluid in said speed control means, a rock shaft, means operable by rocking of said shaft from a normal position to control said speed control device, a plunger, means operable by longitudinal movement of said plunger from a normal position to control said brake control device, an operator's control lever for selectively operating said shaft and plunger, and means for preventing longitudinal movement of said plunger except with said shaft in said normal position and for preventing rocking of said shaft except with said plunger in said normal position.

5. An apparatus for controlling the propulsion, the reversing and braking of a locomotive comprising an operator's control lever having a neutral position and movable in either one direction or in the opposite direction or in a third direction from said neutral position, reversing means for said locomotive operable upon movement of said lever from said neutral position in said one direction to condition said locomotive for operation in a forward direction and operable upon movement of said lever in said opposite direction from neutral position to condition said locomotive for operation in a rearward direction, power control means operable upon movement of said lever in either said one or opposite directions from said neutral position to provide propulsion power for moving said locomotive and operable in said neutral position to cut off said propulsion power, braking means operable upon movement of said lever in said third direction from neutral position to brake said locomotive and operable in said neutral position to free said locomotive for movement, and means for preventing movement of said lever in said third direction except from said neutral position.

6. A control apparatus for a reversible, electric motor propelled locomotive having an engine driven generator for supplying electric current to operate said motor comprising in combination, an operator's control lever having a neutral position and being movable therefrom in either one direction or in the opposite direction or in a third direction, reversing means for said motor operable upon movement of said lever in said one direction to condition said motor for operation in one direction and operable upon movement of said lever in said opposite direction to condition said motor for operation in the opposite direction, switch means for making the breaking and current supply circuit between said generator and motor and operable upon movement of said lever in both said one and opposite directions from neutral position to close said circuit and operable in said neutral position to open said circuit, speed regulating means for said engine having an idle position and movable out of said idle position upon movement of said lever in either said one or opposite directions from neutral position and movable to said idle position upon movement of said lever to said neutral position, brake means for said locomotive, brake control means controlled by said lever for controlling said brake means and operable to effect operation of said brake means to brake said locomotive upon movement of said lever from said neutral position in said third direction and operable to effect operation of said brake means to free said locomotive for movement upon movement of said lever to said neutral position, and means for preventing movement of said lever in said third direction except from said neutral position.

7. A control apparatus for a reversible, electric motor propelled locomotive having an engine driven generator for supplying electric current to operate said motor comprising in combination, an operator's control lever having a neutral position, a contact closed position at either side of said neutral position and a power control zone beyond each contact closed position, a shaft rockable by and with said lever, a forward control wire, a reverse control wire, reversing means operable upon supply of electric current to said forward wire to condition said motor for propelling said locomotive in one direction, and operable upon supply of electric current to said reverse wire to condition said motor for propelling said locomotive in the opposite direction, switch means on said shaft operable upon movement of said lever to one of said contact closed positions to supply electric current to said forward wire and operable upon movement of said lever to its other contact closed position to supply electric current to said reverse wire and operable upon movement from either contact closed position in the direction of the other to cut off the supply of electric current to the respective wire, circuit control means controlling the circuit between said generator and motor and operable to open said circuit upon movement of said lever from either contact closed position in the direction of the other contact closed position and cooperative with said reversing means to close said circuit upon movement of said reversing means to the position corresponding to the contact closed position of said lever, power regulating means for said engine having an idle position and movable out of said idle position to accelerate said engine, and power control means controlled by said lever for controlling said power regulating means and operable in the neutral position of said lever to effect operation of said regulating means to said idle position and operable upon movement of said lever into either one of said zones to effect operation of said regulating means out of said idle position.

8. An apparatus for controlling the power, reversing and braking of a reversible locomotive comprising in combination, a rock shaft, a parallel arranged longitudinally movable plunger, a lever connected to said shaft and plunger and operable to turn said shaft in either direction from a neutral position to a second position and into a zone beyond the said second position and also operable to move said plunger longitudinally, reversing means for said locomotive controlled by said shaft and operable upon rocking thereof to said second position at one side of said neutral position to condition said locomotive for propulsion in one direction and operable upon rocking of said shaft to said second position at the opposite side of said neutral position to condition said locomotive for propulsion in the opposite direction, power control means for said locomotive controlled by said lever and operable in neutral position thereof to cut off the supply of propelling power to said locomotive and operable upon movement into said zone at either side of said neutral position to provide power for propelling said locomotive, brake means operable by fluid under pressure to brake said locomotive and operable upon release of fluid under pressure to free said locomotive for movement, and valve means operable by longitudinal movement of said plunger to control supply and release of fluid under pressure to and from said brake means.

9. An apparatus for controlling the power, reversing and braking of a reversible locomotive comprising in combination, a rock shaft, a parallel arranged longitudinally movable plunger, a lever connected to said shaft and plunger and operable to turn said shaft in either direction from a neutral position to a second position and into a zone beyond the said second position and also operable to move said plunger longitudinally, reversing means for said locomotive controlled by said shaft and operable upon rocking thereof to said second position at one side of said neutral position to condition said locomotive for propulsion in one direction and operable upon rocking of said shaft to said second position at the opposite side of said neutral position to condition said locomotive for propulsion in the opposite direction, power control means for said locomotive controlled by said lever and operable in neutral position thereof to cut off the supply of propelling power to said locomotive and operable upon movement into said zone at either side of said neutral position to provide power for propelling said locomotive, brake means operable by fluid under pressure to brake said locomotive and operable upon release of fluid under pressure to free said locomotive for movement, valve means operable by longitudinal movement of said plunger to control supply and release of fluid under pressure to and from said brake means, and means for preventing operation of said lever to effect operation of said valve means except from said neutral position of said lever.

10. An apparatus for controlling the power, reversing and braking of a reversible locomotive comprising in combination, reversing means for said locomotive, power control mechanism for said locomotive, an operator's control lever having a neutral position, a first control means operable upon movement of said lever from said neutral position in one direction to effect operation of said reversing means to condition said locomotive for operation in one direction and operable upon movement of said lever from neutral position in the opposite direction to condition said locomotive for operation in the reverse direction, a second control means operable upon movement of said lever in either said one or opposite directions to effect operation of said power control mechanism to provide propelling power to said locomotive and operable in said neutral position to cut off said propelling power, means providing for movement of said lever from said neutral position relative to said first and second control means, an application pipe, a distributing valve release pipe, a brake pipe, a distributing valve device comprising an application portion having a chamber open to said application pipe and operable upon supply of fluid under pressure to said chamber to effect an application of locomotive brakes and operable upon release of fluid under pressure from said chamber to effect a release of locomotive brakes, an equalizing portion normally connecting said chamber to said distributing valve release pipe and operable upon a reduction in brake pipe pressure to close said communication and to supply fluid under pressure to said chamber, a first valve means for supplying fluid under pressure to and for releasing fluid under pressure from said distributing valve release pipe, a second valve means operable to open said application pipe to atmosphere, means operable by said lever to selectively control said first and second valve means by movement of said lever relative to said first and second control means, and a one-way flow communication connecting said pipes providing for flow of fluid under pressure only in the direction from said distributing valve release pipe to said application pipe.

11. An apparatus for controlling the power, reversing and braking of a reversible locomotive comprising in combination, reversing means for said locomotive, power control mechanism for said locomotive, an operator's control lever having a neutral position, a first control means operable upon movement of said lever from said neutral position in one direction to effect operation of said reversing means to condition said locomotive for operation in one direction and operable upon movement of said lever from neutral position in the opposite direction to condition said locomotive for operation in the reverse direction, a second control means operable upon movement of said lever in either said one or opposite direction to effect operation of said power control mechanism to provide propelling power to said locomotive and operable in said neutral position to cut off said propelling power, means providing for movement of said lever from said neutral position relative to said first and second control means, an application pipe, a distributing valve release pipe, a brake pipe, a distributing valve device comprising an application portion having a chamber open to said application pipe and operable upon supply of fluid under pressure to said chamber to effect an application of locomotive brakes and operable upon release of fluid under pressure from said chamber to effect a release of locomotive brakes, an equalizing portion normally connecting said chamber to said distributing valve release pipe and operable upon a reduction in brake pipe pressure to close said communication and to supply fluid under pressure to said chamber, a first valve means for supplying fluid under pressure to and for releasing fluid under pressure from said distributing valve release pipe, a second valve means operable to open sad application pipe to atmosphere, means operable by said lever to selectively control said first and second valve means by said movement of said lever relative to said first and second control means, an engineer's automatic brake valve device having a normal position for opening said distributing valve release pipe to atmosphere, and other valve means controlled by said lever controlling communication between said distributing valve release pipe and automatic brake valve device and operable in neutral position of said lever to open the communication and operable upon operation of said lever to effect operation of said first valve means to supply fluid under pressure to the distributing valve release pipe, to close the last named communication.

ELLIS E. HEWITT.

REFERENCES CITED

The following references are of record in the file of this patent:

UNITED STATES PATENTS

| Number | Name | Date |
|---|---|---|
| Re. 20,565 | Staude | Nov. 30, 1937 |
| 1,457,489 | Barton | June 5, 1923 |
| 1,964,069 | McCune | June 26, 1934 |
| 2,151,924 | Logan | Mar. 28, 1939 |
| 2,151,925 | Logan | Mar. 28, 1939 |
| 2,238,574 | Thomas | Apr. 15, 1941 |
| 2,243,883 | Ramstad | June 3, 1941 |
| 2,249,955 | Hewitt | July 22, 1941 |
| 2,366,020 | Good | Dec. 26, 1944 |
| 2,386,391 | Fike et al. | Oct. 9, 1945 |
| 2,406,264 | Stevens | Aug. 20, 1946 |
| 2,413,390 | Stevens | Dec. 31, 1946 |
| 2,426,064 | Stevens | Aug. 19, 1947 |
| 2,433,916 | May | Jan. 6, 1948 |
| 2,480,521 | Thompson | Aug. 30, 1949 |